(12) United States Patent
Zheng et al.

(10) Patent No.: US 12,371,593 B2
(45) Date of Patent: Jul. 29, 2025

(54) FRAME SEALANT, PREPARATION METHOD THEREOF AND DISPLAY PANEL

(71) Applicant: HKC CORPORATION LIMITED, Guangdong (CN)

(72) Inventors: Xinglong Zheng, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 308 days.

(21) Appl. No.: 17/889,625

(22) Filed: Aug. 17, 2022

(65) Prior Publication Data

US 2023/0057812 A1 Feb. 23, 2023

(30) Foreign Application Priority Data

Aug. 18, 2021 (CN) .......................... 202110951130.3

(51) Int. Cl.
*H01B 1/24* (2006.01)
*C08K 3/04* (2006.01)
(Continued)

(52) U.S. Cl.
CPC ................. *C09J 9/02* (2013.01); *C08K 3/041* (2017.05); *C09C 1/46* (2013.01); *C09C 3/10* (2013.01);
(Continued)

(58) Field of Classification Search
CPC .......... H01B 1/24; C08K 3/041; C08K 3/046; C08L 63/00; C08L 63/10; C08L 33/02; C09J 133/02; C09J 163/00; C09J 163/10
See application file for complete search history.

(56) References Cited

U.S. PATENT DOCUMENTS

2015/0133593 A1* 5/2015 Kissell ..................... C08K 7/24
524/496
2023/0287187 A1* 9/2023 Van Raalten ............. C09C 1/48

FOREIGN PATENT DOCUMENTS

CN 103173159 A 6/2013
CN 105542685 A 5/2016
(Continued)

OTHER PUBLICATIONS

Vijayan et al "The geometrical advantages of helical carbon nanotubes for high-performance multifunctional polymeric nanocomposites", Composites Part B 156 (2019) 28-42.*
(Continued)

*Primary Examiner* — Mark Kopec
(74) *Attorney, Agent, or Firm* — Maier & Maier, PLLC (57) ABSTRACT

The present application discloses a frame sealant and its preparation method and display panel. The frame sealant of the present application includes frame sealant glue and conductive fibers dispersed in the frame sealant glue, and the conductive fibers have a three-dimensional helical structure. The frame sealant of the present application has excellent electrical conductivity, high packaging quality, excellent toughness and packaging bonding strength after curing, and improves the anti-separation ability of the two substrates of the box. The preparation method of the frame sealant of the present application can ensure that the prepared frame sealant has stable performance and high efficiency. The display panel contains the frame sealant of the present application, with stable display and long service life.

17 Claims, 4 Drawing Sheets

(51) Int. Cl.
*C09C 1/46* (2006.01)
*C09C 3/10* (2006.01)
*C09J 7/10* (2018.01)
*C09J 9/02* (2006.01)
*C09J 11/04* (2006.01)
*C09J 11/06* (2006.01)
*C09J 133/00* (2006.01)
*C09J 133/10* (2006.01)
*C09J 163/00* (2006.01)

(52) U.S. Cl.
CPC ............... *C09J 7/10* (2018.01); *C09J 11/04* (2013.01); *C09J 11/06* (2013.01); *C09J 133/10* (2013.01); *C09J 163/00* (2013.01); *H01B 1/24* (2013.01); *C09J 2203/326* (2013.01); *C09J 2301/312* (2020.08); *C09J 2301/314* (2020.08); *C09J 2301/408* (2020.08)

(56) References Cited

FOREIGN PATENT DOCUMENTS

CN 108864773 A 11/2018
JP 5638372 A 4/1981

OTHER PUBLICATIONS

Li et al "Performances of epoxy-based composites with multi-wall carbon nanotubes and acrylic tri-block copolymer", Nanocomposites 2019, vol. 5, No. 1, 28-35 https://doi.org/10.1080/20550324.2019.1601804.*

Bortz et al "Carbon nanofibers enhance the fracture toughness and fatigue performance of a structural epoxy system", Composites Science and Technology 71 (2011) 31-38.*

* cited by examiner

FRAME SEALANT, PREPARATION METHOD THEREOF AND DISPLAY PANEL

CROSS-REFERENCE TO RELATED APPLICATIONS

This application claims priority benefits to Chinese Patent Application No. 202110951130.3 filed Aug. 18, 2021. The contents of all of the aforementioned applications, including any intervening amendments thereto, are incorporated herein by reference.

BACKGROUND

Technical Field

The present application relates to the technical field of display consumables, and specifically relates to a frame sealant and its preparation method and display panel.

Description of Related Arts

In the production process of the thin film transistor liquid crystal display, the color filter substrate and the array substrate need to be bonded together, and the material for bonding is the frame sealant composition. At present, the box-forming process mostly adopts the one-drop filling method (ODF). Light irradiation, followed by heating, achieves curing of the frame sealant composition.

The frame sealant composition plays the role of bonding the array substrate and the color filter substrate, and is used to seal the liquid crystal. Therefore, the frame sealant composition is a key material in the process of making a liquid crystal panel into a box. For twisted nematic (TN mode) or vertical alignment (VA mode), in addition to adding glass fiber to support the cell thickness in the frame sealant, gold spheres need to be added to conduct conduction upper and lower substrates. However, it is necessary to mix glass fiber and gold ball particles into the frame sealant. It is inevitable that due to uneven mixing, the supporting force of each part is inconsistent. Curing such a frame sealant around the LCD display panel will lead to inconsistent thickness of the surrounding cells, resulting in the surrounding area. The gap defect will affect the display effect of the liquid crystal display panel. The presence of glass fibers and gold spheres also affect the curing of frame sealant. There are some problems in bonding performance. For example, under the conditions of high temperature and high humidity, the existing frame sealant composition has poor adhesion, which is easy to cause liquid crystal to flow out, thereby causing defects in the liquid crystal display.

SUMMARY

The purpose of the embodiments of the present application is to overcome the above-mentioned deficiencies of the prior art, and to provide a frame sealant and a preparation method thereof. The frame sealant has excellent electrical conductivity, strong bonding strength and mechanical properties, and high packaging quality, so as to solve the problem of the existing frame sealant. Technical problems such as inconsistent box thickness and poor adhesion.

Another object of the present application is to provide a display panel with high packaging quality, good display effect and stability, so as to solve the problem of the existing display panel due to the problem of frame sealant, the packaging quality is not ideal and the display effect and stability are affected.

In order to achieve the above application purpose, in one aspect of the present application, a frame sealant is provided. The frame sealant of the present application includes a frame sealant glue, a conductive fiber. The conductive fiber has a three-dimensional helical structure, and the conductive fibers are dispersed in the frame sealant glue. In this application, the conductive fiber with a three-dimensional helical structure is added to the frame sealant, which on the one hand endows the frame sealant with excellent electrical conductivity and avoids the use of materials with different morphologies of glass fibers and gold spheres, thereby significantly improving the packaging quality; on the other hand, the conductive fiber has a three-dimensional helical structure, which endows the cured frame sealant with excellent toughness and packaging bonding strength, and improves the separation resistance of the two substrates of the box.

Furthermore, the weight content of the conductive fiber in the frame sealant glue is 0.5%-0.8%. By increasing the content of the conductive fiber, the conductive fiber with a three-dimensional helical structure in the frame sealant glue, the effect of the conductive fiber in the frame sealant glue is improved, and the packaging quality of the frame sealant is Furthermore improved. The toughness and packaging bond strength of the frame sealant are Furthermore improved.

Furthermore, the diameter of the conductive fiber is 60 nm-140 nm. The conductive fiber in this diameter range has relatively excellent mechanical properties such as toughness and strength, thereby Furthermore improving the toughness and packaging bond strength of the cured frame sealant.

Furthermore, the conductive fiber is surface-modified with a coupling agent. The surface of the conductive fiber modified by the coupling agent contains functional groups, which effectively enhances the compatibility between the conductive fiber and the frame sealant glue, improves the dispersion performance of the conductive fiber in the frame sealant glue, and shortens the curing of the frame sealant. time, the bonding strength at the interface between the two substrates of the box is improved, and the packaging stability is improved.

Specifically, the coupling agent is an ethoxy-containing coupling agent. On the one hand, the coupling agent containing ethoxy functional groups enhances the cross-linking between the coupling agent and the resin component contained in the frame sealant glue, and improves the fixed strength of the conductive fiber during the curing of the frame sealant. A strong chemical bond is formed between the two substrates of the box to enhance the package strength.

Furthermore, the conductive fiber includes at least one of carbon nanofiber and carbon nanotube. These conductive fibers not only have excellent electrical conductivity, but also have good mechanical properties such as toughness.

Furthermore, when the conductive fiber is a carbon nanofiber, the carbon nanofiber is graphitized. The graphitized carbon nanofiber improves the electrical conductivity of the frame sealant, and also improves the mechanical properties such as the rigidity of the carbon nanofiber, thereby improving the packaging strength and electrical conductivity of the cured frame sealant.

Specifically, the graphitization rate of the graphitized carbon nanofiber is 20%-80%. The carbon nanofiber with this graphitization rate further improves the electrical conductivity of the frame sealant and the mechanical properties such as the rigidity of the carbon nanofiber, thereby improving the packaging strength and electrical conductivity of the cured frame sealant.

Furthermore, the diameter of the three-dimensional helical structure of the conductive fiber is 350 nm-400 nm. The helical pitch of the three-dimensional helical structure of the conductive fiber is 80 nm-120 nm. The three-dimensional helical structure of this size further improves the cured frame sealant to have excellent toughness and packaging bonding strength, and improves the bonding strength of the two substrates to the box.

Furthermore, the frame sealant glue includes the following components by weight:
epoxy resin 10-25%
acrylic resin 60-75%
photoinitiator 0.5-1%
thermal curing agent 5-8%.

The frame sealant glue of the formula can effectively disperse the conductive fibers, and improve the packaging quality and bonding strength of the frame sealant.

Specifically, epoxy resin includes bisphenol A-type epoxy resin; acrylic resin includes methacrylic resin; photoinitiator includes alkylphenone photoinitiator; thermal curing agent includes polyvalent aliphatic amine thermal curing agent. By optimizing the selection and optimization of each component of the frame sealant glue, the dispersion and compatibility of the frame sealant glue to the conductive fiber are improved, and the packaging quality and bonding strength of the frame sealant glue are further improved.

Specifically, the viscosity of frame sealant is 240-270 mPa·s. The frame sealant of the present application has moderate viscosity, which can improve the uniformity of packaging, improve the quality of packaging, and has a good packaging effect.

Another aspect of the present application provides a preparation method for the frame sealant of the present application. The preparation method of the frame sealant of the present application includes the following steps:
pre-dispersing a conductive fiber and components contained in a frame sealant glue to obtain a mixture;
milling the mixture to obtain a frame sealant;
the conductive fiber has a three-dimensional helical structure.

The preparation method of the frame sealant of the present application directly mixes the conductive fiber of the three-dimensional helical structure with the frame sealant glue, and then mills mixtures, so that the conductive fiber can be uniformly dispersed, so as to give full play to its function, and endow the prepared frame sealant with the above-mentioned frame sealant of the present application. The excellent performance of the preparation method of the frame sealant of the present application can ensure that the prepared frame sealant has stable performance and high efficiency, and is suitable for industrial production.

Furthermore, before the components contained in the frame sealant glue are mixed and processed, the conductive fiber further includes a step of using a coupling agent to modify the surface of the conductive fiber. The surface of the conductive fiber is modified by the coupling agent, so that functional groups are connected to the surface of the conductive fiber, the compatibility between the conductive fiber and the frame sealant glue is enhanced, and the dispersion performance of the conductive fiber in the frame sealant glue is furthermore improved. The functional group can interact with the frame sealant glue resin component, shorten the curing time of the frame sealant, improve the bonding strength at the interface between the two substrates of the box, and improve the packaging stability.

Furthermore, the temperature of the pre-dispersing was 20° C.-30° C., and the time of the pre-dispersing was 2 h-4 h.

Furthermore, the temperature of milling is 30° C.-50° C.

The pre-dispersing and milling condition can further improve the dispersion stability of the conductive fiber, and improve the conductivity, bonding strength and stability of the prepared frame sealant.

Furthermore, during or after the milling of the mixture, the step of defoaming treatment is also included. Defoaming treatment is performed on the frame sealant to improve the packaging uniformity and strength of the frame sealant and improve the packaging quality.

In another aspect of the present application, a display panel is provided. The display panel of the present application contains the cured frame sealant of the present application or the frame sealant prepared by the preparation method of the frame sealant of the present application. The display panel is packaged with the frame sealant of the present application. The frame sealant can enhance the adhesion between the interfaces of the substrates contained in the display panel, enhance the anti-separation ability of the two substrates of the box, and the packaging is uniform and high in quality, thereby improving the display and extending the service life.

BRIEF DESCRIPTION OF THE DRAWINGS

In order to more clearly illustrate the specific examples of the present application or the technical solutions in the prior art, the accompanying drawings required in the description of the specific examples or the prior art will be briefly introduced below. The drawings are some examples of the present application. For those of ordinary skill in the art, other drawings can also be obtained from these drawings without any creative effort.

FIG. 1 is a transmission electron microscope (TEM) image of a conductive fiber with a three-dimensional helical structure in the example of the application; a is a TEM image of the conductive fiber, and b is a partial enlarged view of a;

DETAILED DESCRIPTION OF THE EMBODIMENTS

In order to make the technical problems, technical solutions and beneficial effects to be solved by the present application clear, the present application will be furthermore described in detail below with reference to the examples. It should be understood that the specific examples described herein are only used to explain the present application, but not to limit the present application.

In this application, the term of "and/or" describes the relationship between related objects, means that there can be three relationships. For example, A and/or B, which can mean that A exists alone, A and B exist at the same time, and B exists alone where A and B can be singular or plural. The character "/" generally indicates that the associated objects are an "or" relationship.

In this application, "at least one" means one or more, and "a plurality of" means two or more. "At least one item(s) as following" or similar expressions refer to any combination of these items, including any combination of single item(s) or a plurality of items(s). For example, "at least one of a, b, or c", or "at least one of a, b, and c", means: a, b, c, a-b (a and b), a-c, b-c, or a-b-c, where a, b, and c can be single or multiple respectively.

It should be understood that, in various examples of the present application, the size of the sequence numbers of the above-mentioned processes does not mean the sequence of execution, some or all of the steps may be executed in parallel or sequentially, and the execution sequence of each process should be based on its functions and is determined by the internal logic and should not constitute any limitation on the implementation process of the examples of the present application.

The terms used in the examples of the present application are only for the purpose of describing specific examples, and are not intended to limit the present application. As used in the examples of this application and the appended claims, the singular forms "a," "an," and "the" are intended to include the plural forms as well, unless the context clearly dictates otherwise.

The weight of the relevant components mentioned in the description of the examples of the present application can not only refer to the specific content of each component, but also can represent the proportional relationship between the weights of the components. It is within the scope disclosed in the description of the examples of the present application that the content of the ingredients is scaled up or down. Specifically, the mass described in the description of the examples of the present application may be a mass unit known in the chemical field, such as μg, mg, g, and kg.

In one aspect, the examples of the present application provide a frame sealant. The frame sealant in the example of the present application includes frame sealant glue, and conductive fibers dispersed in the frame sealant glue.

Figure 1:
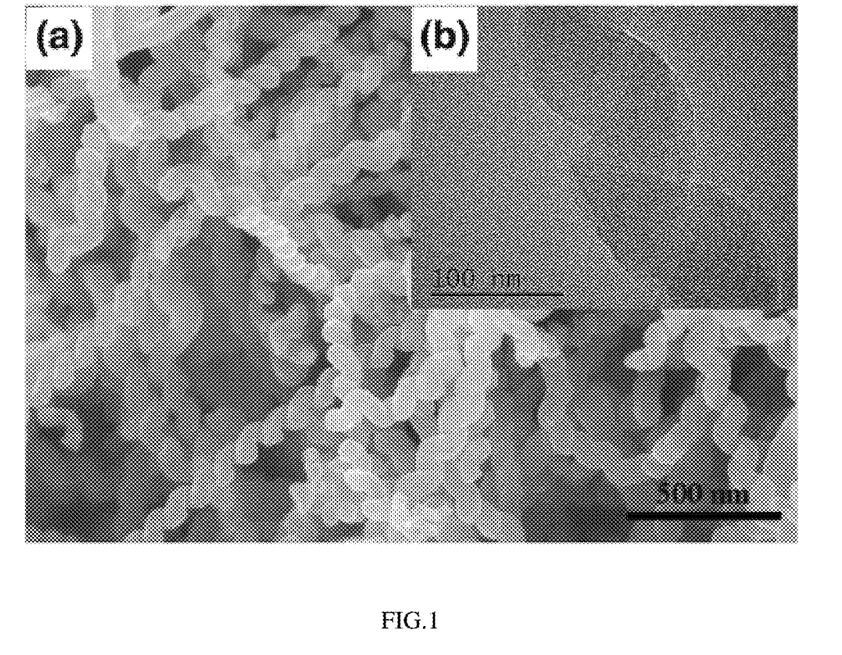
Figure 2:
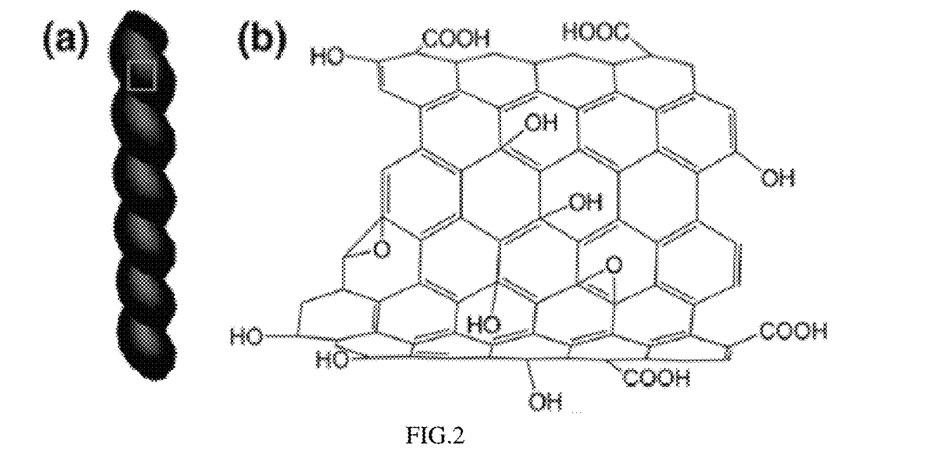
FIG. 2 is a schematic diagram of a conductive fiber with a three-dimensional helical structure modified by a coupling agent in the example of the application; a is a schematic diagram of a conductive fiber with a three-dimensional helical structure, and b is a partial molecular structural formula of the coupling agent combined on the surface of the conductive fiber.

The conductive fiber has a three-dimensional helical structure, and the three-dimensional helical structure is shown in a of FIG. 1 and a of FIG. 2; bin FIG. 1 is a partial enlarged view of a. Electron microscope of FIG. 1 shows that the conductive fiber has an obvious three-dimensional helical structure, which corresponds to the schematic diagram shown in FIG. 2. In this way, the conductive fiber is added to the frame sealant in the example of the present application, and based on the good conductive properties of the conductive fiber, the frame sealant is given excellent conductive properties. At the same time, due to the toughness and unique three-dimensional helical structure of the conductive fiber, the conductive fiber is endowed with excellent mechanical properties such as toughness and strength, thus endowing the cured frame sealant with good mechanical properties and packaging bond strength, which improves the packaging stability and the anti-separation ability of the two substrates of the box.

In the example, the weight content of the conductive fiber in the frame sealant glue is 0.5%-0.8%. By increasing the content of the conductive fiber, the conductive fiber with a three-dimensional helical structure, in the frame sealant glue, the effect of the conductive fiber in the frame sealant glue is improved, and the packaging quality of the frame sealant is further improved. The toughness and packaging bond strength of the frame sealant are further improved.

In the example, the diameter of the three-dimensional helical structure of the conductive fiber is 350 nm-400 nm. Typical but non-limiting diameters of the three-dimensional helical structure are 375 nm, 380 nm, 385 nm, 390 nm, 395 nm, 400 nm, etc. In other examples, the helical pitch of the three-dimensional helical structure of the conductive fiber is 80 nm to 120 nm. In specific examples, the helical pitch of the three-dimensional helical structure may be 80 nm, 85 nm, 90 nm, or 95 nm, 100 nm, 105 nm, 110 nm, 115 nm, 120 nm and other typical but non-limiting helical pitches. The three-dimensional helical structure in this size range can further improve the toughness and strength of the conductive fiber, thereby improving the mechanical properties of the cured frame sealant, such as toughness and packaging bonding strength, thereby improving the bonding strength of the two substrates of the box and the stability of the package.

In the example, the diameter of the conductive fiber is 60 nm to 140 nm, and further is 60 nm to 80 nm. In the specific example, the typical but non-limiting diameters of the conductive fiber are 80 nm, 85 nm, 90 nm, 95 nm, 100 nm, 105 nm, 110 nm, 115 nm, 120 nm, etc. The conductive fibers in this diameter range have relatively excellent mechanical properties such as toughness and strength, thereby improving the toughness and packaging bond strength of the cured frame sealant.

In the examples, the surface of the conductive fibers in the above examples is modified by a coupling agent. The surface of the conductive fiber modified by the coupling agent contains functional groups, which effectively enhances the compatibility between the conductive fiber and the frame sealant glue components, improves the dispersion performance of the conductive fiber in the frame sealant glue, and shortens the frame. The curing time of sealant improves the bonding strength at the interface between the two substrates of the box and improves the packaging stability.

Specifically, the coupling agent includes a coupling agent containing an ethoxy group, such as a coupling agent represented by a partial sub-structural formula shown in b in FIG. 2, specifically such as KH550, KH650 and the functional groups contained therein. The coupling agents containing functional groups, such as coupling agents containing ethoxy functional groups, on the one hand, enhance the cross-linking between the conductive fiber and the resin component contained in the frame sealant glue, and improve the performance of the conductive fiber in curing the frame sealant. In addition, a strong chemical bond is formed with the two substrates of the box to enhance the packaging strength. Since the main component of the two substrates of the cell is generally silicon dioxide, the functional groups contained in the coupling agent, such as ethoxy functional groups, can form strong intermolecular forces with silicon atoms to achieve good bonds.

In the example, the conductive fiber in the above examples includes at least one of carbon nanofiber and carbon nanotube. These conductive fibers not only have excellent electrical conductivity, but also have good mechanical properties such as toughness, thereby improving the packaging bond strength of the frame sealant and the bond strength of the cured frame sealant and the mechanical properties of the urinary catheter.

Figure 3:
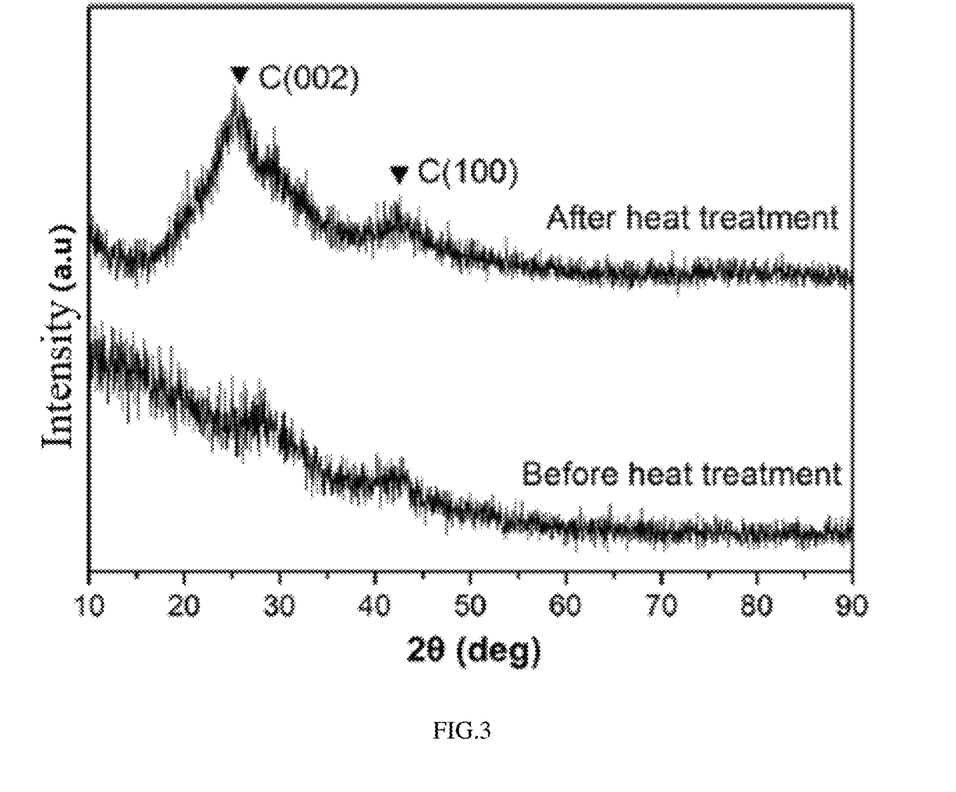
FIG. 3 is an X-ray diffraction pattern (XRD) diagram of the graphitized carbon nanofiber in the example of the application.

In the example, when the conductive fiber is a carbon nanofiber, the carbon nanofiber is graphitized. The X-ray diffraction pattern (XRD) of the graphitized carbon nanofiber is shown in FIG. 3. It can be clearly seen from FIG. 3 that the XRD curve of the graphitized carbon nanofiber shows the graphite characteristic peak C(002)(100) ('JCPDS: 75-1621'), indicating that the graphitized carbon nanofiber has graphite lamellar structure.

Figure 4:
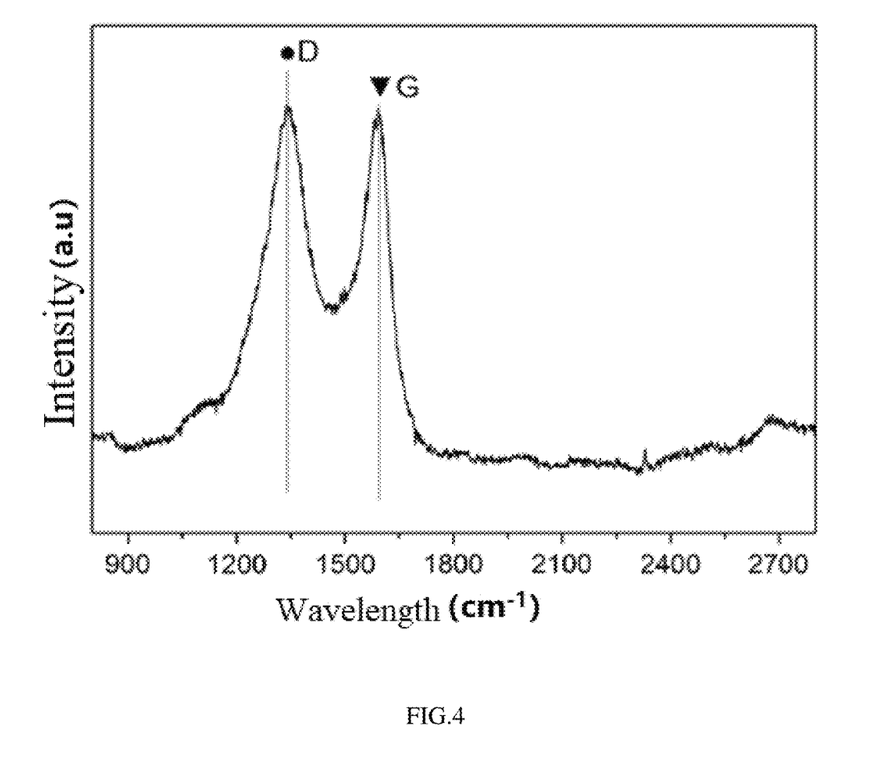
FIG. 4 is the Raman spectrum of the carbon nanofiber of graphitization treatment in the example of the application.

The graphitized carbon nanofiber was further analyzed by Raman spectroscopy, and the Raman spectrum is shown in FIG. 4. As shown in FIG. 4, the Raman spectrum of the graphitized carbon nanofiber has an intensity ratio of D and G peaks at 1353 $cm^{-1}$ and 1597 $cm^{-1}$, respectively, I(D)/I(G) is 1.005, which all indicate that the graphitized carbon nanofiber, such as the spiral carbon nanofiber, is composed of graphite crystallites and partially amorphous structures. Since the carbon nanofiber is graphitized, the graphitized carbon nanofiber improves the electrical conductivity of the frame sealant, and also improves the mechanical properties such as the rigidity of the carbon nanofiber. Due to the excellent electrical conductivity, the addition of gold balls required by the existing frame sealant can be omitted, thereby improving the uniformity of the frame sealant package of the example of the present invention, improving the consistency of the box thickness, and the quality and effect of the package. Moreover, the surface structure of carbon fiber is partially changed, which enhances the compatibility between carbon fiber and frame sealant glue components, improves the role of carbon nanofiber in frame sealant, and the packaging strength of frame sealant after curing.

Specifically, the graphitization rate of the graphitized carbon nanofiber is 20%-80%, furthermore 50%-65%, specifically 20%, 30%, 40%, 50%, 60%, 70%, 80% % and other typical but non-limiting graphitization rates. The carbon nanofiber of this graphitization rate further improves the electrical conductivity of the frame sealant and the mechanical properties such as the rigidity of the carbon nanofiber, and the dispersibility and compatibility in the frame sealant glue, thereby improving the packaging strength and conductivity of the cured frame sealant.

The frame sealant glue contained in the frame sealant is used as the base glue of the frame sealant. On the basis of the conductive fiber examples of the above examples, the frame sealant glue includes the following components by weight percentage:
epoxy resin 10%-25%
acrylic resin 60%-75%
photoinitiator 0.5%-1%
thermal curing agent 5%-8%.

Through the control and adjustment of the components and components of the frame sealant glue, the conductive fibers, especially the conductive fibers and/or graphene whose surfaces are modified by the coupling agent, can be fully dispersed under the full use of the conventional encapsulation effect of the matrix glue which improves the dispersibility of the modified carbon fiber and the compatibility between the conductive fiber and the frame sealant glue resin component, so as to give full play to the above effect of the spiral conductive fiber, and improve the packaging quality and bonding strength of the frame sealant.

In further examples, the epoxy resin may but not only include bisphenol A-type epoxy resin, other epoxy resins are also suitable for the examples of the present application. The acrylic resin may but not only include methacrylic resin. Other acrylic resins are also suitable for the examples of the present application. The photoinitiator includes an alkylphenone photoinitiator, specifically but not only at least one of α,α-diethoxyacetophenone and α-aminoalkylphenone. The thermal curing agent includes polyvalent aliphatic amine thermal curing agent, specifically but not only hexamethylenediamine and dimethylaminopropylamine. Other epoxy resins are also suitable for the examples of the present application. By optimizing the selection and optimization of each component of the frame sealant glue, the dispersion and compatibility of the frame sealant glue to the conductive fiber are improved, and the packaging quality and bonding strength of the frame sealant glue are further improved.

By adjusting and controlling the types and contents of frame sealant glue components and the content of helical conductive fibers, the viscosity of frame sealant is 240-270 mPa·s, further 250±50 mPa·s, specifically 240 mPa·s, 245 mPa·s, 255 mPa·s, 260 mPa·s, 265 mPa·s, 270 mPa·s, etc. typical but non-limiting viscosity. The viscosity data is the viscosity data at temperature. The viscosity range can improve the stability of the frame sealant dispersion system, improve the uniformity of the packaging, the packaging quality, and have a good packaging effect.

Figure 5:
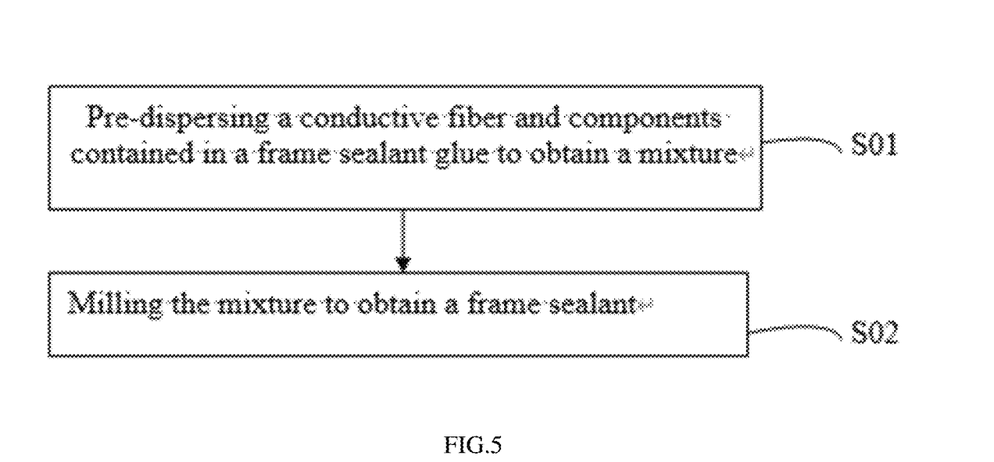
FIG. 5 is the process flow schematic diagram of the preparation method of the frame sealant according to one example of the present application.

Correspondingly, the example of the present application provides the preparation method of the frame sealant of the example of the above text application. The preparation method process flow of the frame sealant in the example of the present application is shown in FIG. 5, and includes the following steps:

Step S01: pre-dispersing a conductive fiber and the components contained in the frame sealant glue to obtain a mixture;

Step S02: milling the mixture to obtain the frame sealant.

The pre-dispersing of the conductive fiber and the frame sealant glue in step S01 is to make the components evenly mixed. Therefore, as long as the mixing method can achieve the uniform mixing of the components, the mixing method is within the scope disclosed in the specification of this application, such as, in the examples, the temperature of pre-dispersing is 20° C.-30° C., and the stirring time is 2 h-4 h. The temperature of the dispersion treatment can be heated by a water bath. Both the conductive fiber and the frame sealant glue are respectively the same as the conductive fiber and frame sealant glue contained in the frame sealant above. Therefore, the conductive fiber in step S01 is the above-mentioned conductive fiber with a three-dimensional helical structure, a spiral conductive fiber.

When the conductive fiber in step S01 is a conductive fiber subjected to surface modification treatment by a coupling agent, in the example, the conductive fiber is used for surface modification of the conductive fiber with a coupling agent before the components contained in the frame sealant glue and the conductive fiber are mixed. In a specific example, the method of using a coupling agent to modify the surface of the conductive fiber can be but not only the modification treatment method in Example 1 as following.

In the example, the temperature of the milling in step S02 is 30° C.-50° C., and the milling should be continuous until the viscosity of the mixture reaches 250±50 mPa·s. In a specific example, the number of times of milling may be 1-3 times, and the milling time for each time is 30 minutes, or the milling may be stirred at 30° C. for 3.5 hours. The milling temperature can be heated by a water bath. Milling under this condition can further improve the dispersion stability of the conductive fiber, and the electrical conductivity, bonding strength and stability of the prepared frame sealant.

Furthermore, during or after the milling treatment of the mixture, the step of defoaming treatment is also included. Defoaming treatment is performed on the frame sealant to improve the packaging uniformity and strength of the frame sealant and the packaging quality.

Therefore, in the preparation method of the frame sealant in the example of the present application, the conductive fiber of the three-dimensional helical structure is directly mixed with the frame sealant glue, and the conductive fiber is then milled, so that the conductive fiber can be uniformly dispersed, so as to give full play to its function, and endow the prepared frame sealant with the excellent performance of the above example. In addition, the preparation method of the frame sealant in the example of the present application is easy to control, so that the prepared frame sealant has stable performance, high efficiency, and reduced cost, and is suitable for industrial production.

On the other hand, on the basis of the above frame sealant and the preparation method thereof, an example of the present application further provides a display panel.

The structure of the display panel in the example of the present application may be a conventional structure, such as a box-to-box formed by including an upper substrate and a lower substrate, or an improved structure based on the conventional display panel structure. Regardless of structure in the example of the present application, the display panel contains the cured frame sealant of the above-mentioned example of the application. The display panel is packaged with the frame sealant in the application example above. The frame sealant can enhance the adhesion between the interfaces of the substrates contained in the display panel, enhance the anti-separation ability of the two substrates of the box, and the packaging is uniform and high in quality. Thus, the display stability of the display panel is improved, and the service life is prolonged.

In addition, the above display panel of the example of the present application can be applied to a display device. For example, the display device includes a display unit, and includes other units necessary for the display device. At least the display unit contains the cured frame sealant of the above example. The display device is packaged by the frame sealant in the above example, which improves the packaging strength of the related components of the display device, and the frame sealant can be uniformly packaged, thereby improving the packaging quality, thereby improving the quality of the display device and the stability of the working performance, extending the service life.

The frame sealant and preparation method thereof and other aspects above are further described by way of examples as following.

Example 1

This example provides a frame sealant and a preparation method thereof. The frame sealant of this example includes the following components by weight:
epoxy resin 20%, acrylic resin 73.75%, photoinitiator 0.75%, thermal curing agent 5%, carbon nanofiber 0.5%.

The epoxy resin was bisphenol A-type epoxy resin, acrylic resin was methacrylic resin, photoinitiator was α,α-diethoxyacetophenone, thermal curing agent was hexamethylenediamine, the carbon nanofiber was helical, and the average diameter of helical structure was 380 nm, the average helical pitch was 100 nm, the diameter of the carbon nanofiber was 100 nm, the carbon nanofiber was graphitized (graphitization rate was 65%), and the surface of the carbon nanofiber was modified by KH550. The frame of this example will be tested. The viscosity of sealant was 240 mPa s.

The preparation method of the frame sealant includes the following steps:
S1. The HCNFs-KH550 composite was mixed with the frame sealant glue components according to the formula of the above frame sealant in Example 1 to obtain a mixture; the HCNFs-KH550 composite was obtained by the following method: the mixture of graphitized helical carbon nanofiber (HCNFs) with a mass fraction of 0.1% and KH550 with a mass fraction of 1.9% were placed in an ultrasonic oscillator for ultrasonic oscillation treatment 2-4 hours, and then were condensed and refluxed at 80° C. to form HCNFs modified with silane coupling agent, HCNFs-KH550 composite with a mass fraction of 2% was obtained;
S2. milling the mixture in step S1 at 50° C. for 2 times, each milling time was 30 minutes, to obtain a frame sealant.

Example 2

This example provides a frame sealant and a preparation method thereof. Compared with Example 1, the frame sealant in this example was different in that HCNFs were not treated with KH550 surface modification.

The preparation method of the frame sealant was formulated with reference to the preparation method of frame sealant in Example 1.

Example 3

This example provides a frame sealant and a preparation method thereof. Compared with Example 1, the frame sealant in this example was different in that the HCNFs were not graphitized.

The preparation method of the frame sealant was formulated with reference to the preparation method of frame sealant in Example 1.

Example 4

This example provides a frame sealant and a preparation method thereof. The frame sealant in this example includes the following components in weight percentages which were the same as those in Example 1. The frame sealant in this example was different in the different HCNFs. The average diameter of the helical structure of the helical carbon nanofiber was 400 nm, the average helical pitch was 100 nm, and the diameter of the carbon nanofiber was 110 nm, the carbon nanofiber was graphitized (graphitization rate was 80%), and the viscosity of the frame sealant of this example will be detected as 270 mPa·s.

The preparation method of the frame sealant was formulated with reference to the preparation method of frame sealant in Example 1.

Example 5

This example provides a frame sealant and a preparation method thereof. The frame sealant of this example includes the following components by weight:
Epoxy resin 15%, acrylic resin 75.4%, photoinitiator 1%, thermal curing agent 8%, carbon nanofiber 0.6%.

The epoxy resin was bisphenol A-type epoxy resin, acrylic resin was methacrylic resin, photoinitiator was α-aminoalkylacetone, thermal curing agent was dimethylaminopropylamine, carbon nanofiber was helical, and the average diameter of dimensional helical structure was 350 nm, the average helical pitch was 800 nm, the diameter of the carbon nanofiber was 140 nm, the nano carbon nanotube was graphitized (graphitization rate was 80%), and the surface of the nano carbon nanotube was modified by KH550. The viscosity was 250 mPa·s.

The preparation method of the frame sealant was formulated with reference to the preparation method of frame sealant in Example 1.

Comparative Example 1

This example provides a frame sealant and a preparation method thereof. Compared with the frame sealant of this example, carbon nanofiber was a one-dimensional fiber, not HCNFs.

The preparation method of the frame sealant was formulated with reference to the preparation method of frame sealant in Example 1.

Figure 6:
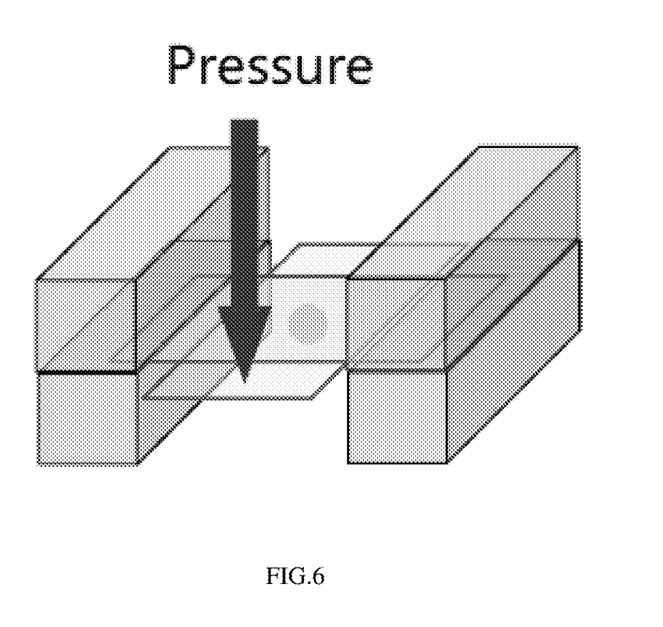
FIG. 6 is a schematic diagram of the principle of testing the peel strength of the frame sealant in the example of the present application.

Performance Testing:

Preparation of Testing Sample:

The frame sealant peel strength test experiment was carried out on 0.5 t thickness PI-coated glass with a size of 40*36 mm. As shown in FIG. 6, the frame sealant was 5 mm away from the surrounding edge of the glass, and the cross-sectional area of the frame sealant coating was 3000±30 μm². Another 0.5 t glass substrate of the same size was crossed with the frame sealant-coated substrate for vacuum box matching. The glass spacing was controlled to be 5 μm; UV curing was then performed, the total energy was controlled at 3000 mJ/cm², and thermal curing was then performed at a temperature of 120° C. for 60 minutes.

Performance Measurement:

Determination of peel strength: the glass substrate was placed on either side of the two broad sides on two support tables, then at one corner of the broad side of the other piece of glass, a pressing mechanical rod was used to press down at a speed of 5 mm/min, when the two pieces of glass were just separated, the actual peeling force was recorded at this time, and the peeling strength was calculated. The test was performed for 5 times and the mean value was recorded.

Experimental Results:

The peel strength of the frame sealant prepared in Example 1 was 17.7 N/mm; the peel strength of the frame sealant prepared in Example 2 was 15.6 N/mm; the peel strength of the frame sealant prepared in Example 3 was 10.2 N/mm; The peel strength of the frame sealant prepared in Example 4 was 10.9 N/mm; the peel strength of the frame sealant prepared in Example 5 was 12.1 N/mm. The peel strength of the frame sealant prepared in Comparative Example 1 was 10.5 N/mm.

The test results of peeling strength shows that the frame sealant of the example of the present application has excellent packaging bonding strength, which improves the anti-separation ability of the two substrates of the box. In addition, it was further measured that the toughness of the examples of the present application was also significantly better than that of the frame sealant prepared in Comparative Example 1, and the electrical conductivity was also relatively excellent.

The above descriptions were only preferred examples of the present application and were not intended to limit the present application. Any modifications, equivalent replacements and improvements made within the spirit and principles of the present application shall be included in the protection of the present application.

What is claimed is:

1. A frame sealant, comprising:
    a frame sealant glue, the frame sealant glue comprising the following components by weight:
    10%-25% of an epoxy resin,
    60%-75% of an acrylic resin,
    0.5%-1% of a photoinitiator, and
    5%-8% of a thermal curing agent; and
    a conductive fiber;
wherein
    the conductive fiber is in a three-dimensional helical structure, and dispersed in the frame sealant glue; a weight content of the conductive fiber in the frame sealant glue is 0.5%-0.8%.

2. The frame sealant of claim 1, wherein
    the conductive fiber is at least one selected from the group consisting of a carbon nanofiber and a carbon nanotube.

3. The frame sealant of claim 2, wherein the conductive fiber is a carbon nanofiber, and the carbon nanofiber is graphitized.

4. The frame sealant of claim 3, wherein the graphitization rate of the carbon nanofiber is 20%-80%.

5. The frame sealant of claim 1, wherein a diameter of the three-dimensional helical structure of the conductive fiber is 350 nm-400 nm.

6. The frame sealant of claim 5, wherein a helical pitch of the three-dimensional helical structure of the conductive fiber is 80 nm to 120 nm.

7. The frame sealant of claim 1, wherein
    a helical pitch of the three-dimensional helical structure of the conductive fiber is 80 nm to 120 nm.

8. The frame sealant of claim 1, wherein
    the epoxy resin comprises bisphenol A-type epoxy resin;
    the acrylic resin comprises methacrylic resin;
    the photoinitiator comprises alkylphenone photoinitiator;
    the thermal curing agent comprises polyvalent aliphatic amine thermal curing agent.

9. The frame sealant of claim 8, wherein a viscosity of the frame sealant is 240-270 mPa·s.

10. The frame sealant of claim 1, wherein the epoxy resin comprises bisphenol A-type epoxy resin.

11. The frame sealant of claim 1, wherein the acrylic resin comprises methacrylic resin.

12. The frame sealant of claim 1, wherein the photoinitiator comprises alkylphenone photoinitiator.

13. The frame sealant of claim 1, wherein the thermal curing agent comprises polyvalent aliphatic amine thermal curing agent.

14. The frame sealant of claim 1, wherein a viscosity of the frame sealant is 240-270 mPa·s.

15. The frame sealant of claim 1, wherein the conductive fiber has a diameter of 60 nm-140 nm.

16. The frame sealant of claim 1, wherein a surface of the conductive fiber is modified by a coupling agent.

17. The frame sealant of claim 16, wherein the coupling agent is an ethoxy-containing coupling agent.

* * * * *